Jan. 21, 1941.	J. H. PLOEHN	2,229,589
WHEEL MAKING MACHINE
Filed March 31, 1939	3 Sheets-Sheet 1

INVENTOR
John H. Ploehn
BY
Morrison, Kennedy & Campbell
ATTORNEYS

Jan. 21, 1941.　　　　J. H. PLOEHN　　　　2,229,589
WHEEL MAKING MACHINE
Filed March 31, 1939　　　　3 Sheets-Sheet 2
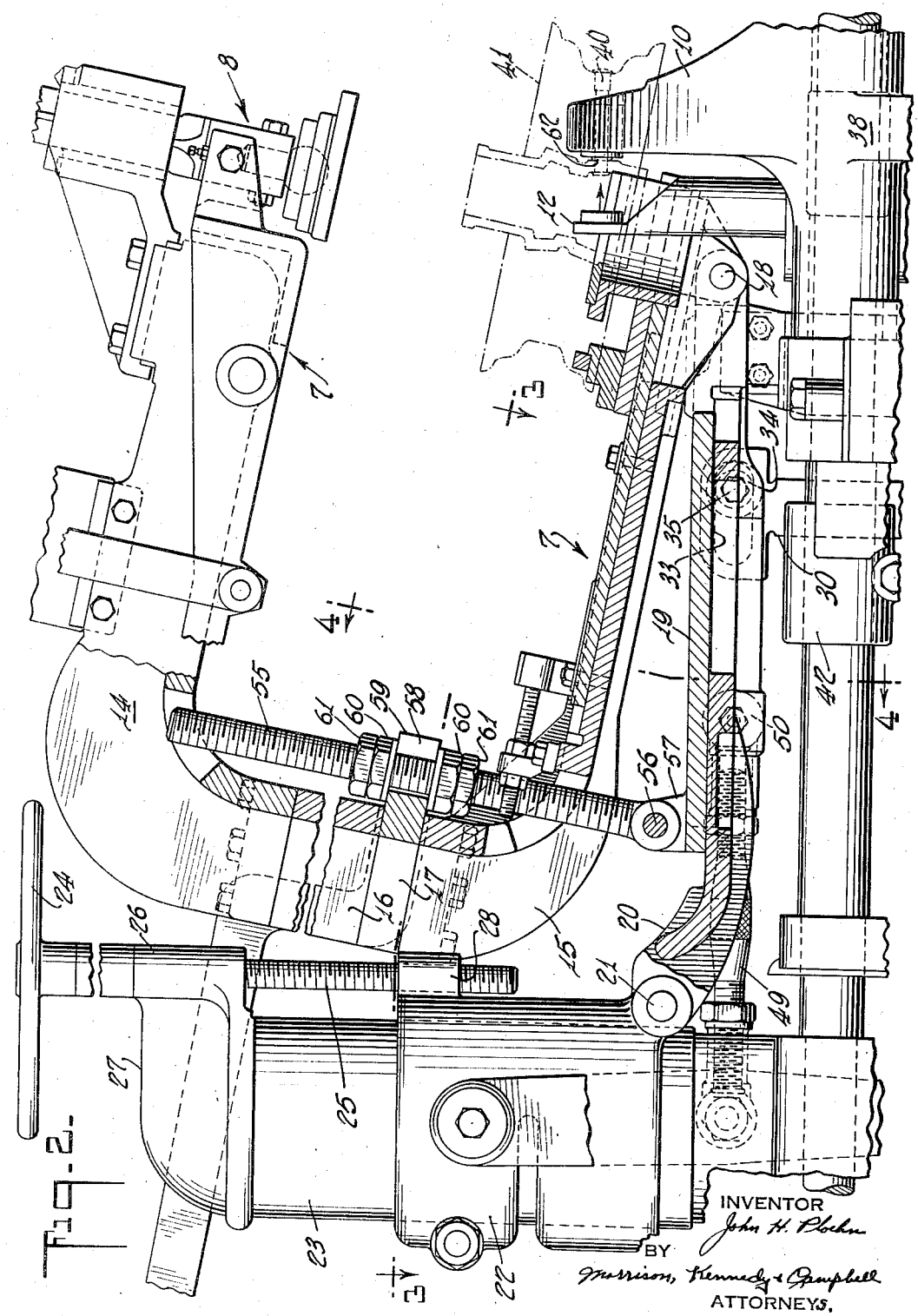
INVENTOR
John H. Ploehn
BY
Morrison, Kennedy & Campbell
ATTORNEYS.

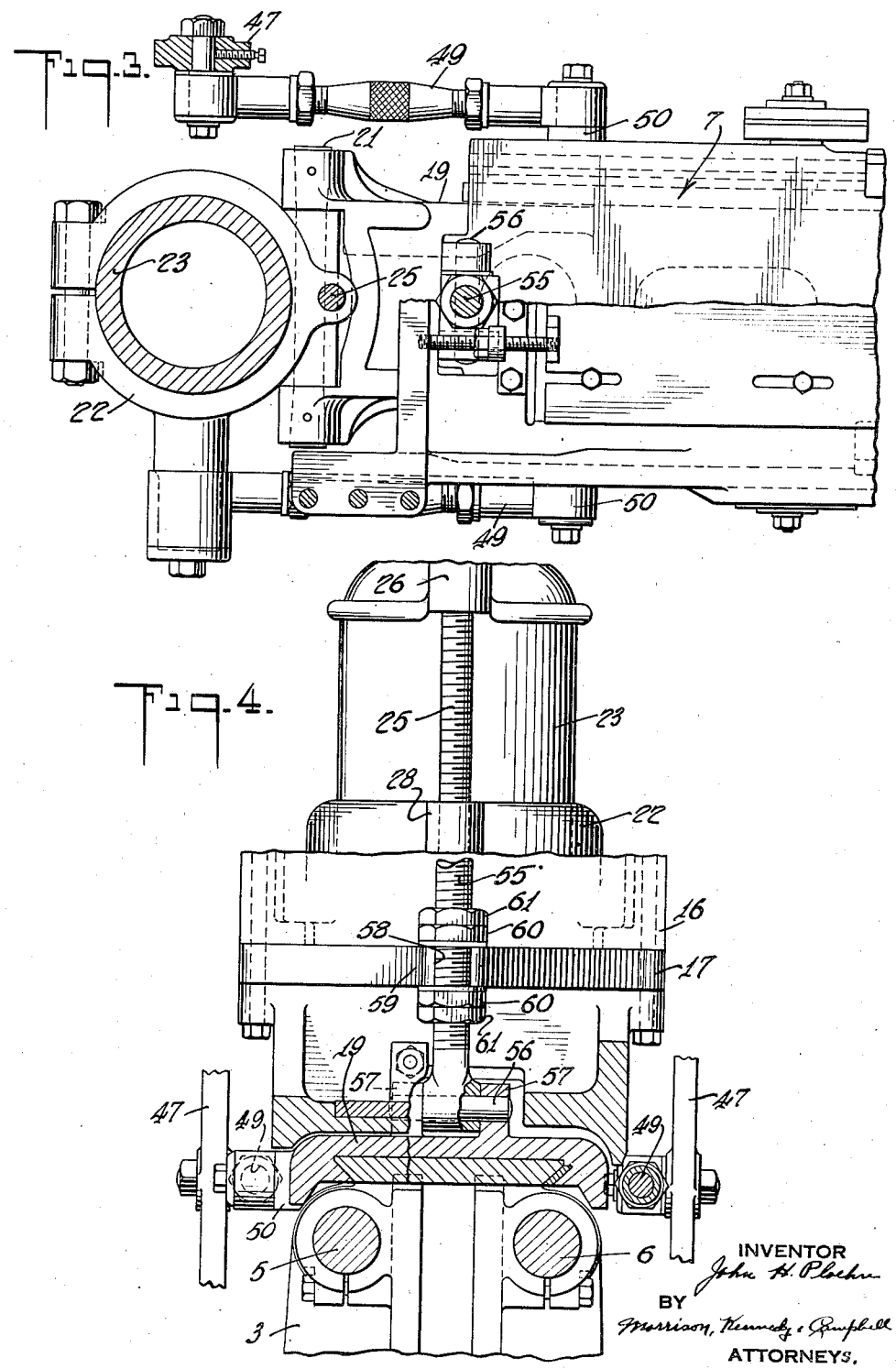

Patented Jan. 21, 1941

2,229,589

UNITED STATES PATENT OFFICE 2,229,589

WHEEL MAKING MACHINE

John H. Ploehn, Bettendorf, Iowa, assignor to French & Hecht, Incorporated, a corporation of Iowa Application March 31, 1939, Serial No. 265,205

12 Claims. (Cl. 78—16)

This invention relates to wheel making machines of the general organization represented in U. S. Letters Patent No. 640,548, wherein a wheel hub and rim to be connected by spokes are supported in the machine in concentric relation to one another and heated spokes inserted through aligned openings in the rim and hub and upset endwise simultaneously to head over the end of the spoke inside the hub and form a shoulder on the spoke to bear against the outer surface of the hub. While the present invention is adapted generally to the form of machine shown in the patent referred to, it finds its particular application in the machines as shown and described in a copending U. S. application Ser. No. 265,204, filed by John H. Ploehn, to which reference may be had for a detailed understanding of the entire machine.

In these machines, the hub and rim are supported on a pivotally mounted gooseneck table, the lower arm of which is adapted to support the hub and rim and the upper arm to carry a clamp for securing the hub in position on the table. The machine is operated pneumatically, its successive operations during each cycle being controlled by valves actuable by a foot treadle. Initially, the table occupies a position with its front end tilted upward for the insertion of a spoke through the openings in the rim and hub, and when the cycle of operation of the machine is inaugurated by a partial depression of the foot treadle, air is exhausted from a table-lifting cylinder, allowing a piston therein to descend and permitting the front end of the table to drop into operative position to lower the hub over a spoke heading tool or header and locate the portion of the spoke outside the hub between a pair of vice jaws. Further depression of the foot treadle effects the admission of air into a cylinder to raise a piston therein for actuating the vise jaws to clamp and hold the spoke against movement during the upsetting operation. After the spoke is clamped between the vise jaws, depression of the foot treadle through the remainder of its downward stroke causes the header inside the hub to move forwardly toward the vise jaws to upset and head over the heated end of the spoke against the inner surface of the hub. At the same time, the table supporting the hub moves in the same direction as the header, but only half as far, causing the portion of the spoke between the outside of the hub and the vise jaws to be upset to form the shoulder, the vise jaws being equipped with dies into which the displaced metal flows and by which it is confined to force it against the outer surface of the hub and mold it to the desired shape. When the upsetting operation is completed, relief of the pressure on the foot treadle permits its return stroke and the machine operates by the exhaust of air from the header and vise jaw actuating cylinders to effect the retraction of the table and header and the opening of the vise jaws to release the spoke, and by the admission of air to the table-lifting cylinder to tilt the front end of the table to its original upper position so that the spoke clears the top edges of the vise jaws. The hub clamp is then released to permit the turning of the hub and rim to the proper position for operation on another spoke. The operation of the machine as just set forth is repeated for each successive spoke.

The lower arm of the table is pivoted at its front end to a slide mounted for fore and aft movement on a supporting plate pivotally connected at its rear end to a collar arranged on a part of the machine frame and adapted for vertical adjustment to raise and lower the rear end of the table as a whole. Near its front end, the table slide is supported by a table lifting mechanism, and means is provided for adjusting the front end of the table vertically to different set positions. These adjustments are necessary since the front end of the table must be set at different heights according to the length of the hub to be operated upon or because of various angularities of the hub walls, which frequently are not parallel with the axis of the hub. Also, when the spoke holes in the hub walls are not uniformly located lengthwise of the hub (vertically when the hub is positioned on the table), it is necessary to vary the vertical position of the front end of the table for each individual spoke.

The rear end of the table is adjustable both to maintain a horizontal disposition of the table when the front end thereof is adjusted, and to tilt the rear end of the table to locate the spoke in operative relation to the vise jaws when the spoke hole is formed at an angle in the hub wall. However, if the rear end of the table is tilted, when it is moved forwardly during the spoke upsetting operation to form the shoulder on the spoke, the direction of pressure is not along the center line or axis of the spoke but at an angle thereto according to the tilt of the table. Because the front end of the table is connected to the piston in the table lifting cylinder, the fore and aft movement of the table is not in a truly horizontal path but in a slightly arcuate path determined by the swing of the side links pivotally connected to the opposite sides of the slide and to a cross-head on the table lifting piston rod. The foregoing arrangement results in the heated end of the spoke being subjected to a shearing action as the shoulder is being formed, producing an offset, unsymmetrical shoulder that is defective and objectionable both from the standpoint of strength and of appearance.

It is the object of the present invention to obviate this and other objectionable features of the prior art, and to provide means whereby the pressure exerted by the movement of the table to upset the spoke and form a shoulder thereon is applied along the center line or axis of the spoke, regardless of the angle at which the spoke hole is formed in the hub wall.

To this end, and in its broader aspects, the present invention provides means for adjusting the rear end of the table vertically relatively to its slide support. More specifically, the rear end of the table is connected to the table slide by a screw threaded stud pivotally mounted on the slide and extending through an aperture in a lug at the rear end of the table, adjusting and locknuts being arranged on opposite sides of the lug for moving the rear end of the table up or down relatively to the slide and locking it in the desired position, the slide remaining horizontally disposed. Such adjustment renders it possible to locate the table at an angle to the slide with the axis of the spoke arranged in the spoke hole in the wall of the wheel hub on the table horizontally disposed or parallel to the slide, so that pressure exerted through the slide in the formation of the shoulder on the spoke will be along the axis of the spoke. In order that the slide may move in a truly horizontal path during its fore and aft movement, the side links connecting the table lifting piston to the slide are fastened to the slide so that the slide is movable relatively thereto. This is accomplished by forming each side link with an elongated slot through which a stud extends and is secured to the slide, the stud carrying a roller adapted to ride in the slot to minimize wear of the relatively movable parts, and each side link is arranged in a guideway formed in the machine frame so as to be capable of vertical movement only.

Referring to the drawings:

Fig. 2 is a fragmentary side elevation of the machine, partly in section and partly broken away to show the construction;

Fig. 3 is a plan view taken approximately on the line 3—3 of Fig. 2, looking in the direction of the arrows, some of the parts being broken away to show the construction; and Fig. 4 is a view taken approximately on the line 4—4 of Fig. 2, looking in the direction of the arrows, some of the parts being broken away.

Figure 1:
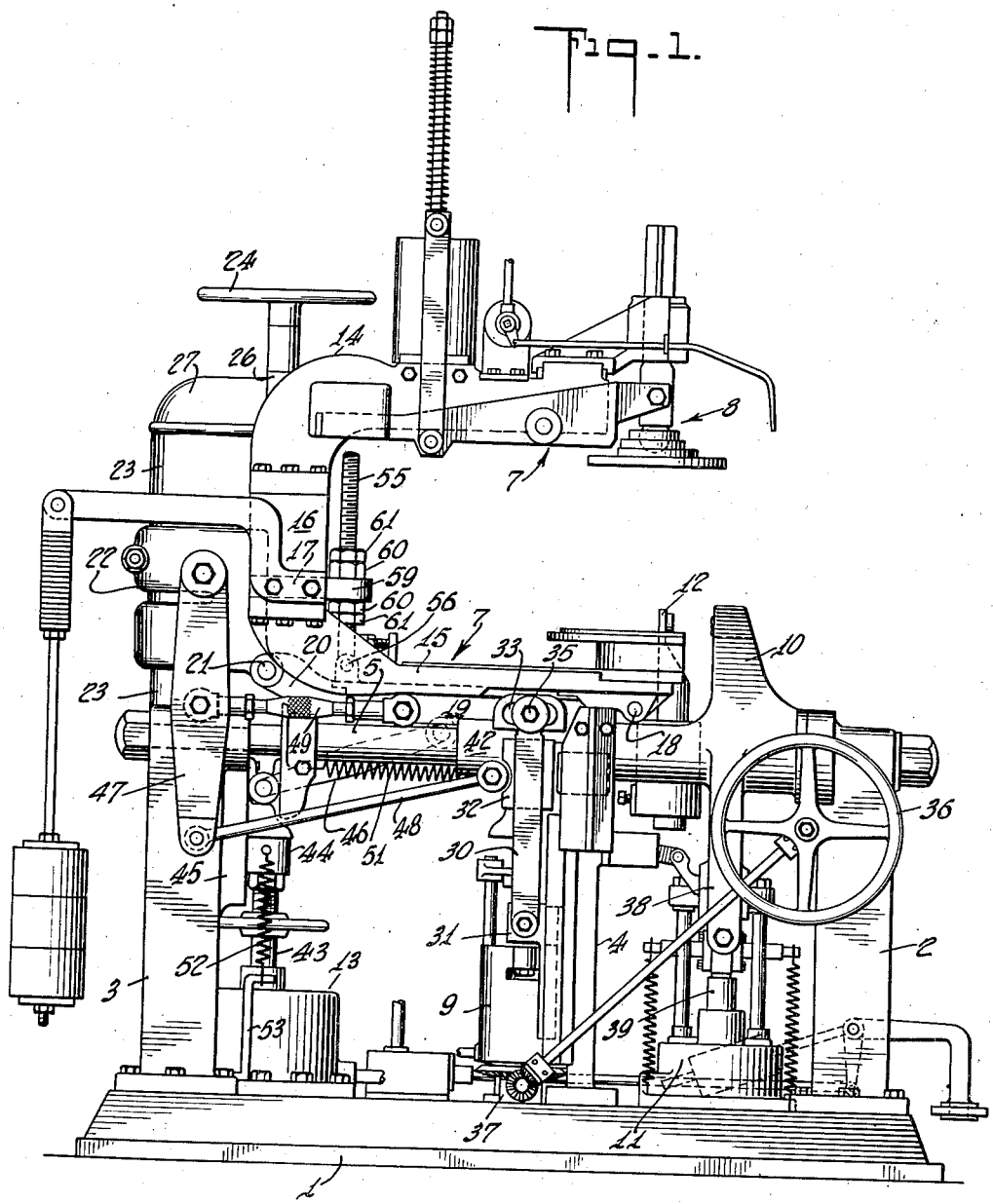
Fig. 1 is a side elevation of the machine.

The machine comprises a base 1 on which front, rear and intermediate pedestals 2, 3 and 4, respectively, are mounted and which support two horizontal parallel guide bars 5 and 6 circular in cross-section, these parts constituting the main frame of the machine. Mounted in the frame are the three fundamental units of the machine, namely, the work supporting table 7 with its associated hub-clamping ram 8 and lifting cylinder 9, the spoke-clamping vise jaws 10 (one only being shown) and their actuating cylinder 11, and the header 12 and its actuating cylinder 13.

The table 7 is formed with upper and lower arms 14 and 15, respectively, spaced apart vertically at the front and connected at the rear by spacing members 16 and 17. The lower arm 15 is pivotally mounted at its front end on studs 18, by which it is connected to a slide 19 mounted for reciprocation on a supporting plate 20 pivoted at its rear end as at 21 to a collar 22. The collar 22 is mounted for vertical adjustment on a cylindrical machined column 23 of the rear pedestal 3, the adjustment of the collar to determine the set position of the rear end of the table as a whole being effected by means of a hand wheel 24 fixed to a screw 25 supported in a bearing 26 of a bracket 27 and passing through an internally threaded lug 28 formed on the collar 22.

The table lifting air cylinder 9 is mounted on the base 1 of the machine beneath the forward end of the table 7 and is connected with the table slide 19 by a pair of vertical side links 30. The links 30 are fastened at their lower ends to a cross-head 31 on a piston rod in the cylinder 9 and extend upwardly through bearings 32 formed in the ends of the cross-head of the intermediate pedestal 4 and in which they slidingly engage for vertical movement only. The upper ends of the links 30 are T-shaped and formed each with an elongated slot 33 in which rollers 34 mounted on studs 35 fixed to the slide 19 are adapted to ride. The air cylinder 9 is mounted for adjustment as a whole by rotation of a hand wheel 36 acting through a series of shafts and bevel gears to rotate a low-pitch screw jack 37 on which the cylinder 9 is supported, such adjustment providing for the easy, rapid and accurate vertical adjustment of the front end of the table 7 in its operative position.

Toward the front end of the machine, the air cylinder 11 is mounted on the base 1 between depending arms 38 (one only being shown) of the vise jaws 10, which arms 38 are rockably mounted one on each of the guide bars 5 and 6. The lower end of each of the arms 38 is connected to a rod 39 of a piston within the cylinder 11, the arrangement being such that when the piston rises in the cylinder the arms are forced outwardly in opposite directions to close the vise jaws 10 on a spoke, as on the spoke 40 in the wheel 41 (Fig. 2), and, upon descent of the piston, the arms are pulled toward one another to open the vise jaws 10 and release the spoke.

The header mechanism comprises a fore and aft centrally located shaft or header bar carrying the header 12 and having its front end mounted for reciprocation in a bearing in the front pedestal 2 and its opposite end adjustably and removably mounted in a slide-block 42 mounted on the parallel guide bars 5 and 6 of the frame. The air cylinder 13, located immediately in front of the rear pedestal 3, is equipped with a piston having the rod 43 thereof connected to a slide-block 44 mounted for vertical reciprocation in a guideway 45 formed in the front face of the rear pedestal 3, and a connecting link 46 is pivotally secured at one end to the slide-block 44 and at its opposite end to the slide-block 42 which supports the rear end of the header bar. When the piston rises in the cylinder 13, forcing the slide-block 44 upwardly, the link 46 is moved toward a horizontal position, thus forcing the slide-block 42 forwardly on the parallel guides 5 and 6 and moving the header bar and header 12 with it.

As already stated, during the spoke-upsetting operation, the table 7 is moved forwardly half as far as the header bar. This is accomplished by pivotally securing the ends of a pair of pendant lever arms 47 to opposite sides of the adjustable collar 22 on the rear pedestal 3 and connecting their opposite or lower ends by a pair of side links 48 (Fig. 1) to the slide-block 42 which supports the rear end of the header bar, and also pivotally securing the ends of a pair of adjustable links 49 substantially midway between the ends of the pendant lever arms 47 and connecting their opposite ends to bosses 50 at the sides of the table slide 19. Thus, when the slide-block 42 supporting the rear end of the header bar moves forwardly, it pulls the lever arms 47 through the side links 48 attached thereto, and this movement of the lever arms 47 acts through the links 49 connecting them with the table slide 19 to move the table 7 in the same direction as the header bar. However, since the links 49 are connected midway between the ends of the lever arms 47, the movement imparted to the table is only half that of the header bar. When air is exhausted from the cylinder 13 and the piston therein descends, the header bar and table 7, along with their various connecting links, are returned to their normal positions by springs 51 secured at one end to the slide-block 42 and having their opposite ends anchored to a fixed part of the machine, and springs 52 anchored to brackets 53 on the base 1 and connected to the slide block 44.

According to a preferred embodiment of the invention, the rear end of the table 7 is connected to its slide 19 by a threaded stud 55 pivotally mounted on a pin 56 extending between upstanding lugs 57 formed on the slide 19. The stud 55 extends upwardly through a bifurcation 58 in a lug 59 formed on the spacing member 17 between the upper and lower arms 14 and 15 of the table. Adjusting and lock nuts 60 and 61, respectively, are threaded on the stud 55 on opposite sides of the lug 59 of the spacing member 17, and by unloosening the locking nuts 61 and turning the adjusting nuts 60 in one direction or the other the rear end of the table 7 may be tilted up or down, as the case may be, to different angular positions relatively to the slide 19, the front end of the table 7 pivoting about the studs 18 on which it is mounted.

With this arrangement, the rear end of the table 7 can be tilted according to the angle of the spoke hole in the hub (see Fig. 2) to locate the spoke 40 in a horizontal position between the vise jaws 10, while the slide 19 remains horizontal. Hence, the axis or center line of the spoke 40 is parallel with the slide 19. When the slide 19 moves forward during the spoke upsetting operation to form the shoulder 62 on the spoke 40, it moves in a truly horizontal path with the rollers 34 riding in the elongated slots 33 of the links 30 connecting the slide 19 with the table lifting mechanism, so that the pressure exerted by the movement of the slide 19 is along the center line of the spoke and the upsetting action results in the formation of a symmetrical shoulder on the spoke having a firm connection with the hub, and no shearing strain is exerted on the shouldered portion of the spoke.

In the accompanying drawings, the invention has been shown merely by way of example and in preferred form, but obviously many modifications and variations may be made therein and in its mode of application which will still be comprised within its spirit. For example, the invention is applicable equally as well to machines for making wheel spiders, that is, wheel hubs with spokes fastened therein and to which the rim is secured subsequently. It is to be understood, therefore, that the invention is not limited to any specific form or embodiment, except insofar as such limitations are specified in the appended claims.

Having thus described my invention, what I claim is:

1. In a wheel spoke securing machine, the combination of a vise for holding a spoke to be secured to a hub, a slide member mounted for horizontal fore and aft reciprocation relatively to the vise to exert pressure on the spoke to effect its upsetting and the formation of a shoulder thereon in securing the spoke to a hub carried by the slide, a support on which the hub is arranged having its front end pivotally connected to the slide member, and means for adjusting the rear end of the support vertically relatively to the slide member to locate the spoke in a horizontal position with its longitudinal axis parallel to the plane of movement of the slide member, whereby pressure exerted by the slide member to form the shoulder on the spoke will be applied along the axis of the spoke.

2. In a wheel spoke securing machine, the combination of a hub support mounted for horizontal fore and aft movement, means for lifting the support vertically, connecting means between the support and the lifting means arranged for vertical movement only, and means for fastening the connecting means to the support for horizontal movement of the support relatively to the connecting means.

3. In a wheel spoke securing machine, the combination of a hub support mounted for horizontal fore and aft movement, means for lifting the front end of the support, side links connecting the support to its lifting means, guideways formed in a fixed part of the machine in which the side links are arranged for vertical movement only, and means for connecting the side links to the support whereby the support is movable horizontally relatively to the side links.

4. A combination according to claim 3, wherein the side links are formed with elongated slots and are connected to the support by studs extending through the slots and on which rollers are mounted and adapted to ride in the slots during the fore and aft movement of the support.

5. In a wheel spoke securing machine, the combination of a slide member mounted for horizontal fore and aft movement, a hub support mounted on the slide member and having its front end pivotally connected thereto, means for adjusting the rear end of the support vertically relatively to the slide member, means for lifting the front end of the slide member and support vertically, and means for connecting the lifting means to the slide member for horizontal movement of the slide member relatively to the lifting means.

6. In a wheel spoke securing machine, the combination of a main frame, a slide member mounted therein for horizontal fore and aft movement, a hub support mounted on the slide member and having its front end pivotally connected thereto, means for adjusting the rear end of the support vertically relatively to the slide member, means for lifting the front end of the slide member and support, a link connecting each side of the slide member to the lifting means, guideways formed in the frame in which the side links are arranged for vertical movement only, a horizontally elongated slot formed in each of the side links, a stud extending through each of the slots and secured to the slide member, and a roller arranged on each of the studs and adapted to ride in the slot in the respective side link during the fore and aft movement of the support, whereby the slide member is adapted to move in a truly horizontal path relatively to the side links and wear of the relatively movable parts is minimized.

7. In a wheel spoke securing machine, the combination of a vise for holding a spoke to be secured to a hub, a member mounted therein for reciprocation horizontally toward and away from the vise, a hub support carried by said member, separate means arranged one at the forward end and one at the following end of the member for effecting a vertical adjustment of the member at one or both ends, the hub support carried by the member being correspondingly adjusted, and means for adjusting the hub support at an angle relatively to said member, whereby pressure exerted by the movement of said member to secure the spoke to the hub carried by the hub support will be along the center line or axis of the spoke.

8. In a wheel spoke securing machine, the combination of a vise for holding a spoke to be secured to a hub, a member mounted therein for reciprocation horizontally toward and away from the vise, a hub support pivoted at its forward end to said member, separate means arranged one at the forward end and one at the following end of the member for effecting a vertical adjustment of the member at one or both ends, the hub support carried by the member being correspondingly adjusted, and means for adjusting the hub support at an angle relatively to said member, whereby pressure exerted by the movement of said member to secure the spoke to the hub carried by the hub support will be along the center line or axis of the spoke.

9. In a wheel spoke securing machine, the combination of a vise for holding a spoke to be secured to a hub, a member mounted therein for reciprocation horizontally toward and away from the vise, a hub support pivoted at its forward end to said member, separate means arranged one at the forward end and one at the following end of the member for effecting a vertical adjustment of the member at one or both ends, the hub support carried by the member being correspondingly adjusted, and means pivoted to said member and associated with the hub support for adjusting the following end of the support vertically relatively to said member, whereby pressure exerted by the movement of said member to secure the spoke to the hub carried by the hub support will be along the center line or axis of the spoke.

10. In a wheel spoke securing machine, the combination of a vise for holding a spoke to be secured to a hub, a member mounted therein for reciprocation horizontally toward and away from the vise, a hub support pivoted at its forward end to said member, separate means arranged one at the forward end and one at the following end of the member for effecting a vertical adjustment of the member at one or both ends, the hub support carried by the member being correspondingly adjusted, and means for adjusting the following end of the support vertically relatively to said member, whereby pressure exerted by the movement of said member to secure the spoke to the hub carried by the hub support will be along the center line or axis of the spoke.

11. In a wheel spoke securing machine, the combination of a vise for holding a spoke to be secured to a hub, a member mounted therein for reciprocation horizontally toward and away from the vise, a hub support pivoted at its forward end to said member, separate means arranged one at the forward end and one at the following end of the member for effecting a vertical adjustment of the member at one or both ends, the hub support carried by the member being correspondingly adjusted, a screw threaded stud pivotally secured to said member and extending upwardly through an opening in a lug at the following end of the support, and adjusting and lock-nuts threaded on the stud on opposite sides of said lug for adjusting the following end of the support vertically relatively to said member and locking it in its adjusted position, whereby pressure exerted by the movement of said member to secure the spoke to the hub carried by the hub support will be along the center line or axis of the spoke.

12. In a wheel spoke securing machine, the combination of a vise for holding a spoke to be secured to a hub, a hub support mounted for fore and aft movement relatively to the vise during the spoke securing operation, means for lifting the hub support vertically to carry a spoke secured to the hub clear of the vise, means for connecting the hub support to its lifting means, and means for fastening the connecting means to the hub support whereby the latter is movable horizontally relatively to the connecting means.

JOHN H. PLOEHN.